Oct. 16, 1962
R. B. BEARD
3,059,111
MEASURING APPARATUS
Filed Nov. 12, 1959
2 Sheets-Sheet 1
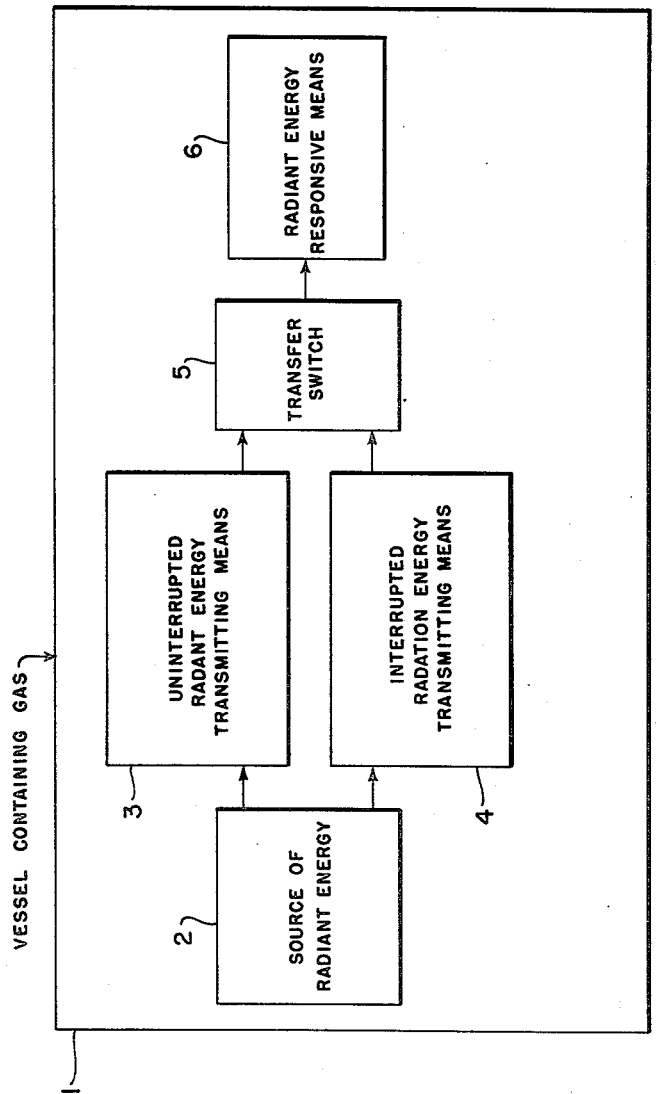
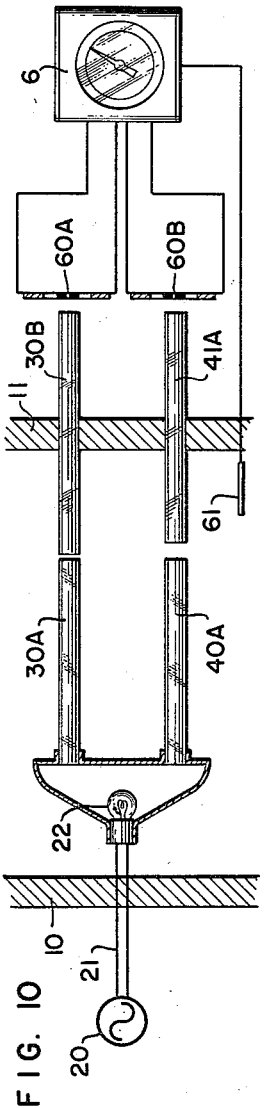
*INVENTOR.*
RICHARD B. BEARD
BY *Arthur N. Swanson*
ATTORNEY.

Oct. 16, 1962  R. B. BEARD  3,059,111
MEASURING APPARATUS
Filed Nov. 12, 1959  2 Sheets-Sheet 2
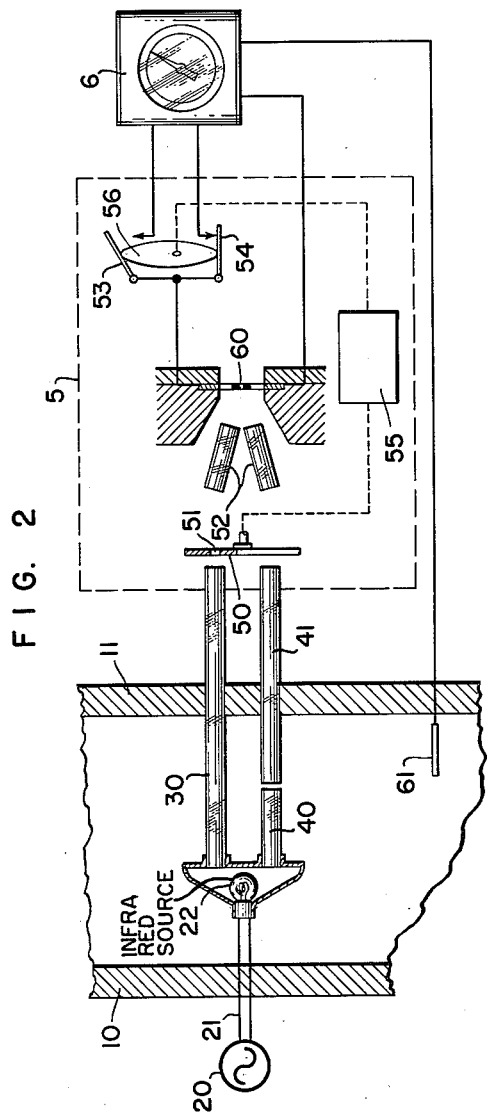
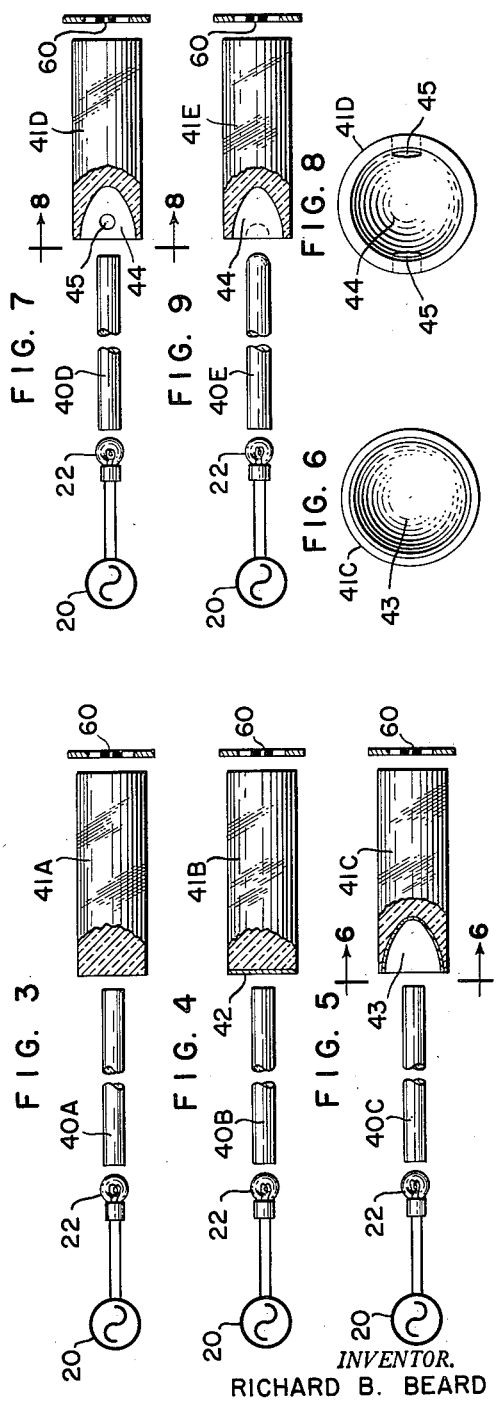
INVENTOR.
RICHARD B. BEARD
BY Arthur H. Swanson
ATTORNEY.

United States Patent Office 3,059,111
Patented Oct. 16, 1962

3,059,111
MEASURING APPARATUS
Richard B. Beard, Narberth, Pa., assignor to Minneapolis-Honeywell Regulator Company, Minneapolis, Minn., a corporation of Delaware
Filed Nov. 12, 1959, Ser. No. 852,394
8 Claims. (Cl. 250—43.5)

This invention relates to apparatus for and method of measuring variation in the moisture content of a hot, gaseous atmosphere by measuring the variation in the amount of radiant energy absorbed by the gas with changes in the moisture content of the gas.

This invention has particular application to tenter frames, drying frames, kilns for cloth, paper, wood, ceramics, and the like. Such devices are operated at temperatures ranging from that of the surrounding atmosphere to approximately 400 degrees Farenheit or higher.

It is an object of this invention to provide an apparatus for and method of measuring moisture which includes a source of radiant energy, uninterrupted radiant-energy-transmitting means connected at one end to said source, interrupted radiant-energy-transmitting means connected at one end to said source and having a gap for the passage of gas therethrough, and radiant-energy-responsive means connected to the other end of each of said transmitting means to receive the radiant energy passing therethrough and to respond to any difference in radiant energy passing through the two means.

A more general object of the present invention is to provide a plurality of paths for radiant energy one of said paths containing (as a part thereof) the gas whose moisture content is to be measured.

A more specific object of the present invention is to provide a plurality of new and improved guides for conducting or transmitting radiant energy emitted by a source thereof to a device responsive to such radiant energy, one of said paths including the gas whose moisture content is to be measured.

A better understanding of the present invention may be had from the following detailed description when read in connection with the accompanying drawings, in which:

FIG. 1 is a block diagram showing the elements which make up the present invention.

FIG. 2 is a diagrammatic or schematic drawing of the elements which make up the present invention.

FIG. 3 is a diagrammatic or schematic drawing of one modification of this invention.

FIG. 4 is a schematic or diagrammatic drawing of another modification of this invention.

FIG. 5 is a diagram or schematic view of a third modification of this invention.

FIG. 6 is an end view of the modification shown in FIG. 5.

FIG. 7 is a diagrammatic or schematic view of a fourth modification of this invention as viewed from the side.

FIG. 8 is an end view of the modification as shown in FIG. 7.

FIG. 9 is a diagrammatic or schematic view of a fifth modification of this invention.

FIG. 10 is a diagrammatic or schematic view of a sixth modification of this invention.

FIG. 1 shows that this invention is useful in connection with a vessel adapted to contain the hot gas whose moisture is to be measured. Such a vessel may be a tenter frame, a drying frame, or a kiln for cloth, paper, wood, ceramics, or the like. Such vessels are customarily operated at temperatures varying from that of the surrounding atmosphere to 400 degrees Farenheit or higher. There is provided a source of radiant energy 2. This source may be located within the vessel 1 or, outside of vessel 1. This source may conveniently produce radiant energy in the infra-red band with the ultra-violet band excluded.

From the source 2 of radiant energy there extend two means for transmitting the radiant energy produced by source 2. Means 3 is an uninterrupted means for transmitting the radiant energy. Means 4 is an interrupted means for transmitting the radiant energy. The interruption in the means 4 is a gap or other means for providing for the gas whose moisture content is to be measured to be part of the path by which this radiant energy is transmitted.

As shown in FIG. 1, means 3 and means 4 may be located entirely within the vessel 1 or one or both ends of each of the transmitting means 3 and 4 may be located outside the vessel.

The ends of means 3 and 4 opposite to those attached to the source 2 are connected to a transfer switch 5. Transfer switch 5 may be omitted if desired. The purpose of this transfer switch is to permit a single radiant-energy-responsive means 6 to be used.

This radiant-energy-responsive means 6 is connected to the output of the transfer switch 5 or, if the transfer switch 5 is not used, directly to those ends of means 3 and 4 which are not connected to the source 2 of radiant energy.

FIG. 2 shows the details of the elements of this invention.

The vessel 1 has vertical walls indicated at 10 and 11. The source 2 of radiant energy comprises a source of radiant energy 20, which may be a source of heat, such as a gas furnace, or a source of electricity, such as an ordinary, commercial supply of 110–115 volt, 60 cycle, alternating current electricity. Source 20 is connected by a conductor of energy, such as a metal pipe which will conduct heat by radiation or conduction, or a metallic cable for conducting electricity, to a source 22 of infra-red rays. Source 22 may be simply a piece of metal which may be heated to incandescence by the heat from source 20, or it may be a metal wire, either bare or enclosed within an envelope, and heated to incandescence by the electricity from source 20. In either case, source 22 is any of the well-known sources which produce radiant energy in the infra-red band and which produce little or no energy in the ultra-violet band.

Connected at one end to the source 22 of infra-red rays is the uninterrupted means for transmitting radiant energy. This means is shown as a rod 30 of sapphire. Also connected at one end to the source 22 of infra-red rays is the interrupted means for transmitting radiant energy. This means is shown as comprising an inlet sapphire rod 40, a gap, and an outlet sapphire rod 41. Sapphire rods 30, 40 and 41 have a mono-crystalline structure which is important in maintaining substantially straight line function of radiant heat or energy transference. Sapphire rods are capable of functioning efficiently up to approximately 2000 degrees centigrade. Such sapphire rods are good conductors of infra-red radiation and may be bent easily without re-crystallization. A rod of ⅛ of 1 inch in diameter and not more than 16 inches in length has been found suitable for all applications because of the low ratio of area to length. However, other diameter sized rods may be employed; but corrections must be made for the change in area-to-length ratio. Where the rods are bent, slightly lower ratings are to be expected depending upon the radius of the band. The sapphire rod 30, 40 and 41 should be located as closely together as possible to eliminate any stray radiation and subject the rods to approximately the same external conditions.

The gap between the confronting faces of rod 40 and of rod 41 should be kept as small as possible. A gap less than one centimeter is preferred. The larger the gap the greater the sensitivity to the pressure of water vapor.

The ends of rods 30 and 41 away from the source 22 of infra-red rays are connected to the transfer switch 5. Transfer switch 5 may be located within vessel 1 but, as shown in FIG. 2, is preferably located outside of vessel 1.

Transfer switch 5 comprises a disc 50 mounted for rotation and having a portion 51 which is opaque to infrared rays so that the portion 51 alternately cuts off the infra-red rays passing from the rod 30 and from the rod 41. Infra-red rays which have passed through the disc 50 are conducted by guides 52 to a detector, shown as a thermopile 60. One end of thermopile 60 is connected to each of a pair of switches 53 and 54. Switches 53 and 54 are adapted to be operated by a cam 56 which is driven by an electric or other motor 55 which also drives disc 50 so that the cam 56 is synchronized with the movement of the disc 50. An example of such a transfer switch is to be found in U.S. Patent 2,503,062; to C. D. Moriarty; patented April 4, 1950.

The opposite sides of switches 53 and 54 and the opposite end of thermopile 60 are connected to means 6 which is responsive to the radiant energy. An example of thermopile 60 and of its use as a means for detecting and responding to radiation as pyrometer is to be found in U.S. Patent 2,357,193; to to T. R. Harrison; patented August 29, 1944. As will be seen by reference to this patent, thermopile 60 is of the wagon wheel type and is located so that the radiant energy is directed upon the hot ends of the thermopile 60. Thermopile 60 may be connected to any suitable radiant energy responsive means 6 such as an electronic potentiometer shown in U.S. Patent 2,423,540; to W. P. Wills; patented July 8, 1947. Such a potentiometer may be calibrated to give an indication of the voltage put out by the thermopile 60 and consequently of the changes in such voltage and therefore of the changes in the moisture content of the gas within the vessel 1. Means 6 has attached to it a temperature compensation 61 which adjusts the means 6 to the temperature existing within the vessel 1. Radiant energy responsive means 6 may also act as a recorder or a controller.

The moisture content of the gas in the vessel 1 is principally in the form of water. Water vapor has the following bands of absorption in the near infra-red region which are: 1.7 to 2.10 microns; 2.2 to 3.0 microns; 4.8 to 8.5 microns; 12.0 to 30.0 microns.

Where 1 micron equals 3.28 to the minus 6 power measured in feet or 10 to the minus 4 power measured in centimeters. It will be noted that these wave lengths fall within the infra-red band and therefore will serve to absorb the infra-red radiant energy.

FIG. 3 shows a modified form of the interrupted means for transmitting radiant energy of this invention. A source 20 supplies radiant energy to an inlet sapphire rod 40A. The opposite end of sapphire rod 40A confronts one end of an outlet sapphire rod 41A. The area of the confronting surface of rod 41A is larger than the area of the confronting surface of rod 40A. Therefore, the outlet sapphire rod 41A absorbs a larger portion of the radiant energy transmitted by the inlet sapphire rod 40A. The opposite end of outlet sapphire rod 41A is connected to a detector, such as thermopile 60, forming part of the means 6 for responding to the radiant energy. If desired, the inlet sapphire rod 40A may have a diameter larger than the diameter of the outlet sapphire rod 41A.

FIG. 4 shows a second modification of this invention in which the source 20 of radiant energy supplies radiant energy to an inlet sapphire rod 40B which has a surface confronting a surface of an outlet sapphire rod 41B which is connected at its opposite end to a detector, such as thermopile 60. The end of sapphire rod 41B adjacent sapphire rod 40B is treated with absorbing coating 42 so that a maximum of energy is received by the outlet sapphire rod 41B.

The absorbing coating must be of a material which not only has a high absorption in the near infra-red region but must also withstand the temperature and deleterious effects of the atmosphere surrounding it.

One example of such a coating would be a film of oxidized copper which could be placed on the surface by first evaporating a film onto the surface and then oxidizing it. The oxidation of the film of copper would take place in the normally hot moist atmosphere of the tenter frame. Other metallic oxide coatings could be used such as oxidized iron, steel or nickel alloy coatings.

FIGS. 5 and 6 show a third modification of this invention. Source 20 of radiant energy supplies radiant energy to an inlet sapphire rod 40C. The opposite end of sapphire rod 40C confronts one end of an outlet sapphire rod 41C. This confronting end of outlet sapphire rod 41C has a hemispherical surface 43 which is of larger cross sectional diameter than the confronting end of the inlet sapphire rod 40C. Therefore, a maximum of energy is transferred from the inlet sapphire rod 40C to the outlet sapphire rod 41C.

FIGS. 7 and 8 show a fourth modification of this invention. A source 20 of radiant energy supplies radiant energy to an inlet sapphire rod 40D which has its opposite end formed in the shape of a hemisphere. An outlet sapphire rod 41D has a confronting surface 44 of substantially hemispherical surface but having broken away portions 45 at diametrically opposite portions thereof so as to provide a passageway for the gas through the gap between the confronting pages of the inlet sapphire rod 40D and the outlet sapphire rod 41D. The confronting surface 44 of the outlet sapphire rod 41D has a greater cross sectional diameter than that of the inlet sapphire rod 40D. Therefore, the transfer of energy between the inlet sapphire rod and the outlet sapphire rod is a maximum.

FIG. 10 shows a sixth modification of this invention in which the transmitting means each has a gap or interruption therein. In this modification the vessel 1 has a plurality of vertical walls 10 and 11 which contain the gas whose moisture content is to be measured. A source 20 of energy is connected by a conductor 21 to a source 22 of infra-red rays. These sources may be of the types disclosed in FIG. 1. There are two interrupted means for conducting radiant energy. The first interrupted means for conducting radiant energy from source 22 comprises an inlet rod 30A and an outlet rod 30B of sapphire or the like having a gap between them. This gap may contain no moisture or a known amount of moisture and may be sealed off to compensate for variations in the output of the source 22 and in the temperature gradient along the tube 30A due to stray radiations.

The second interrupted means for transmitting radiant energy from source 22 comprises an inlet rod 40A and an outlet rod 41A of sapphire or the like with a gap between them. The opposite ends of rods 30B and 41A are sighted upon detectors comprised by thermopiles 60A and 60B. These thermopiles form part of the means 6 responsive to the radiant energy. The detectors 60A and 60B and means 6 may be of the types disclosed in FIG. 1.

The radiation from the source 22 is attenuated proportionately to the water vapor in the gaps between the source 22 and the detectors 60A and 60B. Since the amount of moisture sealed within the gap between rods 30A and 30B is known, any difference between the amounts of radiant energy transmitted by the rods 30A and 30B, rods 40A and 41A must be due to the variations in the moisture content of the gas in the gap between rod 40A and rod 41A. Therefore, the means 6 can be calibrated to indicate, record or exercise a control function proportional to the variations of the moisture content within the vessel 1.

In the claims:

1. Apparatus for measuring moisture, including a source of radiant energy, uninterrupted radiant energy transmitting means connected at one end to said source, interrupted radiant energy transmitting means connected at one end to said source and having a gap receiving therein the gas whose moisture is to be measured, radiant energy responsive means connected to the opposite end of said transmitting means and adapted to respond to any difference in the radiant energy transmitted to said means, and means for compensating said radiant energy responsive means for the temperature in said vessel.

2. Apparatus for measuring moisture, including a source of radiant energy, an uninterrupted sapphire rod connected at one end to said source, an inlet sapphire rod and an outlet sapphire rod having confronting surfaces forming a gap adapted to contain the gas whose moisture content is to be measured, one of said inlet and outlet rods having a larger confronting surface than the other, and radiant energy responsive means connected to the other end of said rods and responsive to any difference in the energy transmitted through said rods.

3. Apparatus for measuring moisture, including a source of radiant energy, an uninterrupted sapphire rod connected at one end to said source, an interrupted sapphire rod connected at one end to said source and having a confronting surface forming a gap intermediate its length, a coating of metallic oxide covering at least a portion of one of said confronting surfaces, and radiant energy responsive means connected to the other end of each of said rods and responsive to any difference between the energy transmitted by said rods.

4. Apparatus for measuring moisture, including a source of radiant energy, an uninterrupted sapphire rod connected at one end to said source, an interrupted sapphire rod connected at one end to said source and having confronting surfaces forming a gap intermediate its length, one of said confronting surfaces being formed of convex shape, and radiant energy responsive means connected to the other end of each of said rods and responsive to any difference between the energy transmitted by said rods.

5. Apparatus for measuring moisture, including a source of radiant energy, an interrupted sapphire rod connected at one end of said source, an interrupted sapphire rod connected at one end to said source and having confronting surfaces forming a gap in its length and having ports passing through the walls thereof and communicating with said gap to transmit a gas to and from said gap, and radiant energy responsive means connected to the other end of each of said rods and responsive to any difference in the energy transmitted by said rods.

6. Apparatus for measuring moisture, including a source of radiant energy, uninterrupted radiant energy transmitting means connected at one end to said source, interrupted radiant energy transmitting means connected at one end to said source and having a gap for the passage of air therethrough, a transfer switch connected to the other end of each of said transmitting means to receive the radiant energy passing therethrough, and radiant energy responsive means connected to the opposite side of said transfer switch to receive radiant energy passing therethrough and to respond to any difference in radiant energy passing through the two means.

7. Apparatus for measuring moisture, including a source of radiant energy, an uninterrupted sapphire rod connected at one end of said source, an interrupted sapphire rod connected at one end to said source and having confronting surfaces forming a gap intermediate its length, a transfer switch connected to the other end of each of said rods, and radiant energy responsive means connected to the opposite side of the transfer switch and responsive to any difference between the energy transmitted by said rods.

8. Apparatus for measuring moisture, including, a source of radiant energy, uninterrupted radiant energy transmitting means connected at one end to said source, interrupted radiant energy transmitting means connected at one end to said source and having a gap for the passage therethrough of gas whose moisture content is to be measured, said gap having an absorbing coating on one side thereof, and radiant energy responsive means connected to the other end of each of said transmitting means to receive the radiant energy passing therethrough and to respond to any difference in radiant energy passing through the two means.

References Cited in the file of this patent

UNITED STATES PATENTS

| | | |
|---|---|---|
| 2,685,649 | Miller | Aug. 3, 1954 |
| 2,688,090 | Woodhull | Aug. 31, 1954 |
| 2,901,626 | Becker | Aug. 25, 1959 |
| 2,904,686 | Sebens | Sept. 15, 1959 |
| 2,904,687 | Sobcov | Sept. 15, 1959 |
| 2,918,578 | Friedman | Dec. 22, 1959 |